(12) United States Patent
Wu et al.

(10) Patent No.: US 10,560,170 B2
(45) Date of Patent: Feb. 11, 2020

(54) METHOD FOR CHANNEL INFORMATION FEEDBACK IN MULTI-ANTENNA SYSTEM, AND TERMINAL

(71) Applicant: ZTE CORPORATION, Guangdong (CN)

(72) Inventors: Hao Wu, Guangdong (CN); Yijian Chen, Guangdong (CN); Jianxing Cai, Guangdong (CN); Huahua Xiao, Guangdong (CN); Yu Ngok Li, Guangdong (CN); Zhaohua Lu, Guangdong (CN); Yong Li, Guangdong (CN); Yuxin Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/068,748

(22) PCT Filed: Feb. 10, 2017

(86) PCT No.: PCT/CN2017/073239
§ 371 (c)(1),
(2) Date: Jul. 9, 2018

(87) PCT Pub. No.: WO2017/118443
PCT Pub. Date: Jul. 13, 2018

(65) Prior Publication Data
US 2019/0020396 A1    Jan. 17, 2019

(30) Foreign Application Priority Data
Jan. 7, 2016   (CN) .......................... 2016 1 0010307

(51) Int. Cl.
*H04B 7/06* (2006.01)

(52) U.S. Cl.
CPC ........... *H04B 7/0626* (2013.01); *H04B 7/063* (2013.01); *H04B 7/0639* (2013.01)

(58) Field of Classification Search
CPC combination set(s) only.
See application file for complete search history.

(56) References Cited

U.S. PATENT DOCUMENTS

| | | | |
|---|---|---|---|
| 10,158,408 B2 * | 12/2018 | Choi | H04B 7/0478 |
| 2008/0094281 A1 * | 4/2008 | Teng | H01Q 1/246 |
| | | | 342/368 |

(Continued)

FOREIGN PATENT DOCUMENTS

| | | |
|---|---|---|
| CN | 103312448 A | 9/2013 |
| CN | 103746779 A | 4/2014 |

(Continued)

OTHER PUBLICATIONS

International Search Opinion and Written Opinion for International Application. No. PCT/CN2017/073239 dated May 2, 2017 in 8 pages.

*Primary Examiner* — Linda Wong
(74) *Attorney, Agent, or Firm* — Knobbe Martens Olson & Bear LLP

(57) ABSTRACT

Provided are a method for channel information feedback in a multi-antenna system, and a terminal. The method comprises: a terminal receives CSI-RSs of M ports sent by a base station, and performs estimation according to the CSI-RSs to obtain M-dimensional downlink channel information; the terminal uses a transformation function $F_k$ to perform a linear transformation on the M-dimensional downlink channel information, and obtains $N_k$-dimensional kth type channels, wherein k is greater than or equal to 1 and less than or equal to K, $M \geq N_k$, and $K \geq 1$; the terminal uses a preset $N_k$-dimensional codebook to respectively perform channel information quantisation on the $k^{th}$ type channels, and deter- (Continued)

mines a corresponding precoding matrix and precoding matrix indicator information ($PMI_k$); the terminal selects S type channels from within K type channels, and feeds index numbers of the selected channels and corresponding PMI back to the base station.

16 Claims, 2 Drawing Sheets

(56) References Cited

U.S. PATENT DOCUMENTS

| | | | | |
|---|---|---|---|---|
| 2009/0322613 A1* | 12/2009 | Bala | ............... | H04B 7/022 342/373 |
| 2012/0069887 A1* | 3/2012 | Park | ............... | H04B 7/0417 375/224 |
| 2012/0314654 A1* | 12/2012 | Kotecha | ............... | H04B 7/0413 370/328 |
| 2013/0258874 A1* | 10/2013 | Khoshnevis | ............... | H04L 5/0057 370/252 |
| 2014/0241455 A1* | 8/2014 | Park | ............... | H04B 1/62 375/285 |
| 2015/0103933 A1 | 4/2015 | Nagata et al. | | |
| 2015/0208397 A1* | 7/2015 | Lee, II | ............... | H04L 5/0048 370/329 |
| 2015/0229371 A1 | 8/2015 | Kim et al. | | |
| 2015/0280884 A1* | 10/2015 | Choi | ............... | H04L 25/0391 370/329 |
| 2015/0304008 A1* | 10/2015 | Wang | ............... | H04B 7/0634 375/267 |
| 2016/0043789 A1* | 2/2016 | Wang | ............... | H04B 7/0469 370/329 |
| 2016/0143055 A1* | 5/2016 | Nammi | ............... | H04W 74/006 370/329 |
| 2016/0156401 A1* | 6/2016 | Onggosanusi | ............... | H04B 7/0478 370/329 |
| 2016/0165457 A1* | 6/2016 | Inoue | ............... | H04W 16/28 455/562.1 |
| 2016/0173176 A1* | 6/2016 | Mizusawa | ............... | H04B 7/0456 375/267 |
| 2016/0248489 A1* | 8/2016 | Yang | ............... | H04B 7/0417 |
| 2016/0301505 A1* | 10/2016 | Furuskog | ............... | H04W 72/00 |
| 2017/0005712 A1* | 1/2017 | Jiang | ............... | H04B 7/0413 |
| 2017/0085303 A1* | 3/2017 | Chen | ............... | H04B 7/0417 |
| 2017/0141832 A1* | 5/2017 | Ji | ............... | H04B 7/0626 |
| 2017/0195100 A1* | 7/2017 | Kim | ............... | H04B 7/06 |
| 2017/0201307 A1* | 7/2017 | Kim | ............... | H04B 7/04 |
| 2017/0310449 A1* | 10/2017 | Kim | ............... | H04L 5/0057 |
| 2017/0373743 A1* | 12/2017 | Park | ............... | H04L 25/02 |
| 2018/0198495 A1* | 7/2018 | Davydov | ............... | H04B 7/0473 |
| 2018/0278390 A1* | 9/2018 | Yakada | ............... | H04W 24/10 |
| 2019/0089441 A1* | 3/2019 | Sivahumaran | ............... | H04B 7/0478 |

FOREIGN PATENT DOCUMENTS

| | | |
|---|---|---|
| CN | 104202073 A | 12/2014 |
| CN | 104662811 A | 5/2015 |

* cited by examiner

METHOD FOR CHANNEL INFORMATION FEEDBACK IN MULTI-ANTENNA SYSTEM, AND TERMINAL

CROSS REFERENCE TO RELATED APPLICATIONS

The present application is a national phase of PCT Application No. PCT/CN2017/073239 filed on Feb. 10, 2017, which claims a priority to Chinese Patent Application No. 201610010307.9 filed on Jan. 7, 2016, the disclosure of which are incorporated in their entireties by reference herein.

TECHNICAL FIELD

Embodiments of the present disclosure relate to, but are not limited to, the field of wireless communications, and in particular, to a method for channel information feedback in a multi-antenna system, and a terminal.

BACKGROUND

In a wireless communication system, a receiving end and a transmission end usually employ space division multiplexing in a multi-antenna system to obtain a higher transmission rate. In order to realize space division multiplexing, the transmission end usually maps a data layer to be transmitted to an antenna port by utilizing precoding, thus obtaining high transmission performance. In order to realize the precoding on the transmission end, the transmission end needs to know all or a part of the channel state information. In a Time Division Duplexing (TDD) system, a transmission end may obtain the channel state information via the reciprocity of uplink and downlink channels; and in a Frequency Division Duplex (FDD) system, the receiving end usually needs to notify the transmission end of the channel state information.

In a Long Term Evolution (LTE) system, the channel state information fed back by a terminal usually contains a Channel Quality Indicator (CQI), a Precoding Matrix Indicator (PMI) and a Rank Indication (RI). The CQI represents channel quality information, and a base station configures a Modulation and Coding Scheme (MCS) adapted to the channel quality according to the CQI; the RI represents the Rank of a channel, and the base station configures a number of suitable data transmission layers based on the RI. The PMI represents a precoding matrix recommended by the terminal, and the base station selects a suitable precoding matrix according to the PMI. As specified in the protocol, after a terminal selects the precoding matrix, the terminal feds back the PMI in an agreed format. The base station may restore, via this format, the precoding matrix selected by the terminal, and this agreed format is referred to as a codebook. In early LTE versions, Discrete Fourier Transform (DFT) vectors can be used as a codebook. That is, a terminal generates a certain number of DFT vectors according to parameters of high-layer signaling configuration, then selects among them a better DFT vector therefrom according to the RI and the channel estimation result, and reports an index number thereof as the PMI to the base station; the base station then can restore the DFT vector recommend by the terminal according to the PMI. With the evolution of LTE, the codebook is further enhanced: the PMIs fed back are divided into long-term feedback and short-term feedback, wherein the long-term feedback keeps constant in bandwidth, and the PMI value of long-term feedback may determine a DFT vector combination, the short-term feedback selects a suitable DFT vector from the DFT vector set, and the PMI value changes with the subband; after a dual polarized antenna is involved, the same DFT vector is selected in the two polarization directions, and only polarization phase difference is involved. In Rel-13 (Version 13), a concept of Frequency Division (FD) Multiple-Input Multiple Output (MIMO) is involved, so that the antenna array of the base station is allowed to be arranged in a 2D topology, and the maximum number of supportable ports is increased to 16, the codebook is enhanced to a form of DFT vector Kronecker product. The PMI includes three parts: a horizontal DFT vector of long-term feedback, a vertical DFT vector of long-term feedback, and a subband feedback for column and phase difference selection; the base station generates a group of DFT vectors as result of the vertical long-term feedback and generates another group of DFT vectors as result of the horizontal long-term feedback. Then a new vector group is generated by obtaining Kronecker product of every two DFT vectors in the two groups of DFT vectors. Finally, a precoding matrix can be constructed, by selecting suitable columns from the newly generated vector group according to the subband feedback result and adding the polarization phase difference. In such the PMI construction and feedback mode, the channel information in the vertical and horizontal dimensions may be utilized simultaneously, and the feedback overhead may be reduced to a certain degree.

However, after the amount of antenna ports is extended to 32, 64 or more, the above method will have several limitations:

a) There are many forms on possible antenna topologies, so that it will increase complexity if a certain codebook is designed for each of the antenna topologies;

b) There are many vectors in a precoding vector set generated via long-term feedback, so that if suitable vectors are to be selected therefrom for feedback, a large feedback overhead will be required; and c) After the scale of antenna arrays is increased, the correlativity between channels cannot be well quantized via the DFT vector-based precoding construction mode.

Based on the above limitations, when the codebook construction and feedback mode in Rel-13 are applied to 32 or more antenna ports, a large feedback overhead will be caused; an and also the corresponding performance gain cannot be attained.

SUMMARY

The following is an overview of the subject matter detailed described herein. However, this summary is not intended to limit the scope of the claims.

The present disclosure provides a method for channel information feedback in a multi-antenna system and a terminal, so as to reduce the feedback overhead.

An embodiment of the present disclosure provides a method for channel information feedback in a multi-antenna system, which includes:

receiving, by a terminal, channel state information-reference signals (CSI-RSs) of M ports transmitted by a base station, and obtaining M-dimensional downlink channel information by estimating according to the CSI-RSs;

performing, by the terminal, a linear transformation on the M-dimensional downlink channel information by using a transformation function $F_k$, to obtain the $k^{th}$ type of channel information with $N_k$ dimensions, wherein k=1, . . . , K, $M \geq N_k$, and $K \geq 1$;

performing, by the terminal, by channel information quantization on the $k^{th}$ type of channel information respectively by using a preset $N_k$-dimensional codebook, to determine a corresponding precoding matrix and precoding matrix indicator information ($PMI_k$); and selecting, by the terminal, s types of channel information from the K types of channel information, and feeding index numbers of the selected channel information and the corresponding PMIs back to the base station.

In an exemplary implementation, the transformation function $F_k$ is a linear transformation function.

In an exemplary implementation, the transformation function $F_k$ is multiplication of a matrix $W_k$, and the matrix $W_k$ is a matrix of M rows and $N_k$ columns.

In an exemplary implementation, for the $i^{th}$ column of the matrix $W_k$, the $k_i^{th}$ element is 1 and the elements other than the $k_i^{th}$ element are 0, and wherein i=1, . . . , $N_k$, and $k_i$=1, . . . , M.

In an exemplary implementation, the matrix $W_k$ meets that: if both an element of the $i^{th}$ column and the $k_i^{th}$ row and an element of the $j^{th}$ column and the $k_j^{th}$ row are 1, and i is not equal to j, then $k_i$ is not equal to $k_j$, wherein both i and j are greater than or equal to 1 and less than or equal to $N_k$, and both $k_i$ and $k_j$ are greater than or equal to 1 and less than or equal to M.

In an exemplary implementation, elements of the matrix $W_k$ are determined by one or more parameters of: a topology of M ports, horizontal and vertical spacing of a starting port, the amount of ports in horizontal and vertical directions, and spans of the ports in the horizontal and vertical directions.

In an exemplary implementation, K>1, and $N_k$ is not exactly equal to each other.

In an exemplary implementation, K>1, and $$\sum_1^K N_k$$

is greater than or equal to M.

In an exemplary implementation, the value of K, the value of $N_k$ and the transformation function $F_k$ are determined according to any one of:

a value of M;

a base station configuration signaling;

a feedback mode; and selecting by the terminal and feeding back to the base station.

In an exemplary implementation, determining the value of K and the value of $N_k$ according to the base station configuration signaling may include:

determining the value of K and the value of $N_k$ according to a topology structure of an antenna of the base station and configuring by the base station signaling; or determining the value of K and the value of $N_k$ according to a codebook configuration type and configuring by the base station signaling.

In an exemplary implementation, determining the transformation function $F_k$ according to the base station configuration signaling may include: if the transformation function $F_k$ is multiplication of a matrix $W_k$, determining positions of non-zero elements in the matrix $W_k$ by the base station configuration signaling; or, determining at least one of followings of the matrix $W_k$ by the base station configuration signaling: the number of rows, the number of columns, or both the number of rows and columns.

In an exemplary implementation, selecting the transformation function $F_k$ by the terminal and feeding the $F_k$ back to the base station may include: if the transformation function $F_k$ is multiplication of a matrix $W_k$, selecting positions of non-zero elements in the matrix $W_k$ by the terminal and feeding the positions back to the base station; or, selecting at least one of followings of the matrix $W_k$ by the terminal and feeding back to the base station: the number of rows, the number of columns, or the number of rows and the number of columns.

In an exemplary implementation, the value of the s is agreed by the base station and the terminal; or the value of the s is determined by a base station configuration; or the value of the s is selected and fed back by the terminal to the base station.

An embodiment of the present disclosure further provides a terminal, which includes:

an acquisition module, configured to receive channel state information-reference signals (CSI-RSs) of M ports transmitted by a base station and obtain M-dimensional downlink channel information by estimating according to the CSI-RSs;

a transformation module, configured to perform a linear transformation on the M-dimensional downlink channel information by using a transformation function $F_k$ to obtain $k^{th}$ type of channel information with $N_k$-dimensions, wherein, k=1, . . . , K, M≥$N_k$, and K≥1;

a determination module, configured to perform channel information quantization on the $k^{th}$ type of channel respectively by using a preset $N_k$-dimensional codebook to determine a corresponding precoding matrix and precoding matrix indicator information ($PMI_k$); and a transmission module, configured to select s types of channel information from the K types of channel information and feed index numbers of the selected channel information and the corresponding PMIs back to the base station.

In an exemplary implementation, the transformation function $F_k$ used by the transformation module is a linear transformation function.

In an exemplary implementation, wherein the transformation function $F_k$ used by the transformation module is multiplication of a matrix $W_k$, wherein the matrix $W_k$ is a matrix of M rows and $N_k$ columns, and the elements of the matrix $W_k$ are determined by one or more parameters of: a topology of M ports, horizontal and vertical spacing of a starting port, the amount of ports in horizontal and vertical directions, and spans of the ports in the horizontal and vertical directions.

An embodiment of the present disclosure further provides a computer-readable storage medium storing computer-executable instructions, which when being executed by the processor, causes the above method for channel information feedback in the multi-antenna system.

In summary, the embodiments of the present disclosure provide a method for channel information feedback in a multi-antenna system and a terminal, which can effectively reduce feedback overhead.

Other aspects will be understood upon reading and understanding the drawings and detailed description.

DETAILED DESCRIPTION

The application will be illustrated in detail in conjunction with the drawings and embodiments. It needs to be noted that, the embodiments of the disclosure and the characteristics in the embodiments may be combined arbitrarily without confliction.

Figure 1:
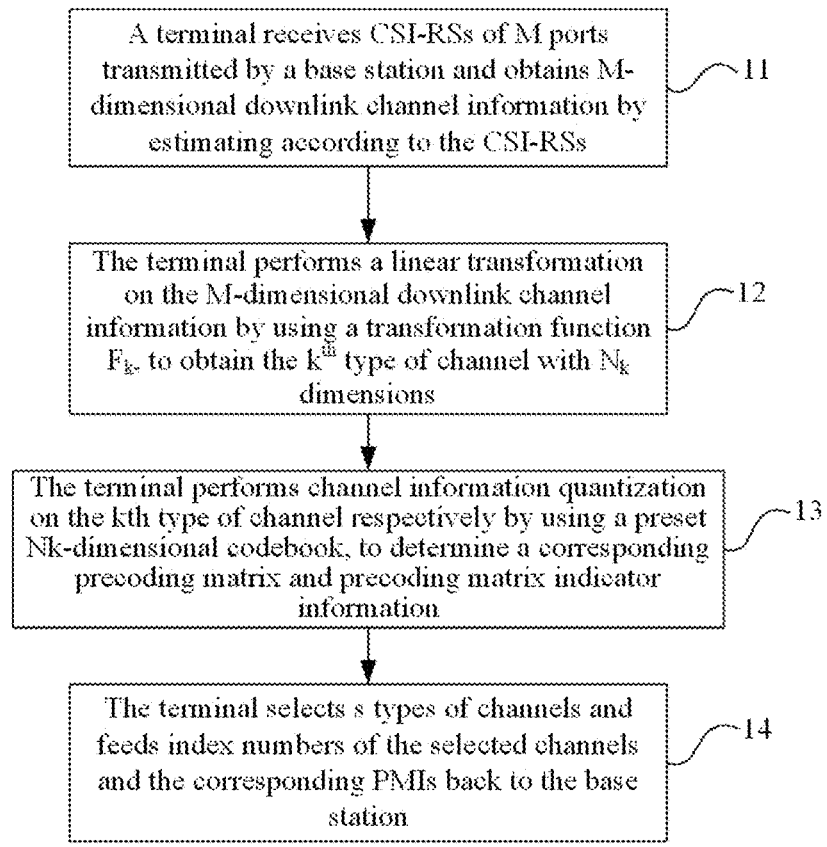
FIG. 1 is a flow chart of a method for channel information feedback in a multi-antenna system according to an embodiment of the disclosure.

FIG. 1 is a flow chart of a method for channel information feedback in a multi-antenna system according to an embodiment of the disclosure. As shown in FIG. 1, the method includes the following steps.

Step 11: A terminal receives channel state information-reference signals (CSI-RSs) of M ports transmitted by a base station and obtains M-dimensional downlink channel information by estimating according to the CSI-RSs.

Step 12: The terminal performs a linear transformation on the M-dimensional downlink channel information by using a transformation function $F_k$, to obtain the $k^{th}$ type of channel information with $N_k$ dimensions, wherein $k=1, \ldots, K$; $M \geq N_k$, $K \geq 1$.

For $K>1$, $N_1, N_2, \ldots, N_K$ may not exactly equal to each other, the sum $$\sum_{1}^{K} N_k$$

thereof may be equal to or greater than M.

In an exemplary embodiment, for $k=1, \ldots, K$, $F_k$ may be multiplication of a matrix $W_k$, wherein, $W_k$ is a matrix of M rows and $N_k$ columns; for example, $W_k$ may be a matrix for antenna port selection, as described below:

For the $i^{th}$ column of $W_k$, the $k_i^{th}$ element is 1 and the elements other than the $k_i^{th}$ element are 0, $k=1, \ldots, K$; $i=1, \ldots, N_k$; $k_i=1, \ldots, M$; in such a case, $W_k$ meets that: if both an element of the $i^{th}$ column and the $k_i^{th}$ row and an element of the $j^{th}$ column and the $k_i^{th}$ row are 1, and i is not equal to j, $k_i$ is not be equal to $k_j$, $k=1, \ldots, K$; i, $j=1, \ldots, N_k$; $k_i, k_j=1, \ldots, M$.

In an exemplary embodiment, the value of K, the values of $N_1, N_2 \ldots N_K$, $F_1, F_2, \ldots F_K$ and the parameters thereof may be configured and transmitted by the base station to the terminal, or they may be selected and reported by the terminal to the base station, or may be determined according to the values of other parameters. For example, the value of K, the values of $N_1, N_2 \ldots N_K$ and $F_1, F_2, \ldots, F_K$ may be determined according to any one of:

a value of M;

a base station configuration signaling; and a feedback mode.

Specifically, determining the value of K and the value of $N_k$ according to the base station configuration signaling may include:

the value of K and the value of $N_k$ are determined according to a topology structure of an antenna if the base station and configuring by the base station signaling; or the value of K and the value of $N_k$ are determined according to codebook configuration type (Codebook-Config) and are configuring by the base station signaling.

Specifically, determining the transformation function $F_k$ according to the base station configuration signaling may include:

if the transformation function $F_k$ is multiplication of a matrix $W_k$, the positions of non-zero elements in the matrix $W_k$ will be determined by the base station configuration signaling, or, the number of rows, the number of columns or both the number of rows and the number of columns, of the matrix $W_k$, will be determined by the base station configuration signaling.

Step 13: The terminal performs channel information quantization on the $k^{th}$ type of channel information respectively by using a preset $N_k$-dimensional codebook, to determine a corresponding precoding matrix and precoding matrix indicator information ($PMI_k$).

Specifically, the terminal performs the channel information quantization on the $1^{st}$ type of channel information, the $2^{nd}$ type of channel information, $\ldots$, the $K^{th}$ type of channel information respectively by using $N_1$-dimension, $N_2$ dimension, $\ldots$, $N_K$-dimensional codebook agreed between the base station and the terminal, to determine the corresponding precoding matrix and index $PMI_1, \ldots, PMI_K$.

Step 14: The terminal selects s types of channel information from the K types of channel information and feeds index numbers of the selected channel information and the corresponding PMIs back to the base station.

Specifically, the value of s may be agreed between the base station and the terminal, or configuring by a base station signaling, or selected and fed back by the terminal to the base station.

The method for channel information feedback in a multi-antenna system according to the embodiments of the disclosure has the following beneficial effects.

For systems with different antenna topologies, there is no need to configure different codebook parameters, thus simplifying the configuration of the codebook;

By appropriately grouping and selecting, the precoding indicator information fed back is determined by the group-number and the vector-number within the group, wherein the period of the change in the group-number is long, so that the feedback overhead may be reduced in such a construction;

By appropriately grouping and selecting, in comparison with the original M ports, each group of N ports obtained may be more suitable for describing the channel correlativity via DFT-based vectors; in addition, other gains such as antenna selection gain may also be obtained, so that a relatively stable performance gain may be obtained based on a certain overhead.

The method of the disclosure will be illustrated in detail below via several embodiments.

Embodiment 1

In this embodiment, it is assumed that the total number of the antennas of base stations is M, and the terminal uses a codebook for N ports as a maximum number of supportable ports, wherein N<M, the method according to in this embodiment may be used for codebook-based precoding construction.

In this embodiment, the precoding matrix has the structure below:

$W = W_0 W_1$;

wherein $W_1$ is a precoding matrix selected by using the codebook for N ports, $W_0$ is an antenna port selection matrix, and mapping is implemented between the M ports and the N ports. The implementation mode includes the following steps.

Step 100: A terminal receives CSI-RSs of M ports transmitted by a base station and obtains M-dimensional downlink channel information by estimating according to the CSI-RSs, and each dimension of downlink channel information corresponds to one of the ports.

Step 101: The M ports channel information is divided into K port groups, with each group including N ports.

Figure 3:
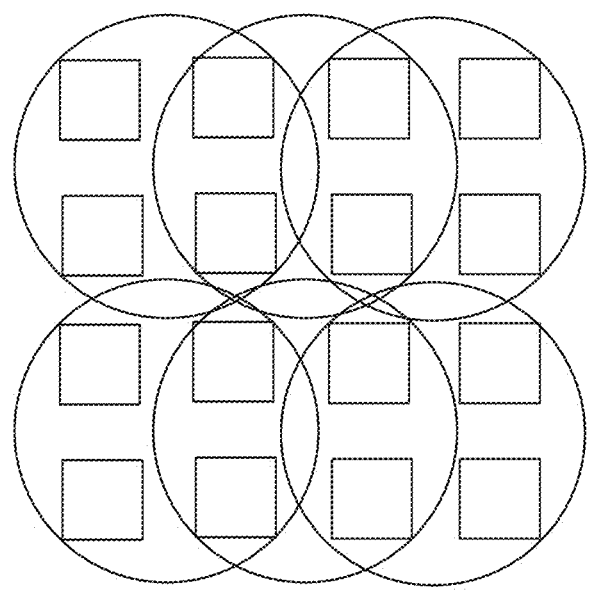
FIG. 3 is a schematic diagram of port grouping according to an embodiment of the disclosure.

A collection of K port groups is equal to the original M ports. FIG. 3 shows an example of the grouping scheme, wherein 16 ports are divided into 8 groups, and each group includes 4 ports. In this way, the M (for example, 16)-dimensional channel information obtained in Step 100 is mapped as K (for example, 8) types of channel information, and the $k^{th}$ type of channel information corresponds to the channel information of the $k^{th}$ port group; the $k^{th}$ type of channel information includes N (for example, 4)-dimensional channel information, which corresponds to N ports in the $k^{th}$ port group.

The transformation function $F_k$ in this embodiment is equivalent to multiplication by a matrix $W_0$.

Step 102: In each group, the terminal performs channel information quantization on the $k^{th}$ type of channel information respectively according to N-port codebooks, selects a precoding matrix and takes it as a candidate precoding.

Step 103: The terminal selects s precoding matrixes from the K candidate precoding matrixes as the final precoding matrixes.

Step 104: The terminal feeds back the group-number of the selected precoding matrix and the precoding matrix index obtained in this group according to the codebook for N ports to the base station.

As described above, the construction of $W_0$ is as shown below:

$$W_0 = [e_M^{\pi 1}, L, e_M^{\pi N}];$$

wherein $e_a^b$ represents a vector with a dimension of a×1, the $b^{th}$ element of 1 and other elements of 0; $(\pi_1, L, \pi_N)$ represents an arrangement consisted of N numbers from (1, L, M), wherein $\pi_1, L, \pi_N$ are port-numbers included in the group containing the final precoding matrix selected from K candidate precoding matrixes.

Embodiment 2

In this embodiment, in LTE Rel-13, based on that the number of ports supportable by the codebook is extended to 16 and a concept of vertical and horizontal dimensions is introduced, the codebook can be used for 2D-rectangular and 1D-linear base station topologies. For the number of antenna ports such as 32, 64 or more, the method of this embodiment may be used for precoding construction based on the existing {8, 12, 16}-port codebook. The method according to this embodiment is based on the method of Embodiment 1, the base station has totally M antenna ports, and the terminal constructs a precoding codebook based on the codebook for the number {8, 12, 16} of ports. The precoding has a structure below:

$$W = W_0^k W_1 W_2;$$

wherein $W_0^k$ performs antenna port selection, $W_1$ performs bandwidth beam selection, and $W_2$ performs subband beam selection. The realization mode includes following steps.

Step 201: The M antenna ports are divided into K groups, each group includes {8, 12, 16} ports, each polarization direction includes {4, 6, 8} ports, these ports may be arranged in topology structures of {4×2, 2×4, 8×1, 2×3, 3×2, 2×2, 4×1}, and the determination of the grouping scheme includes one of the schemes below:

Determination according to a base station configuration signaling: the base station may determine the grouping scheme via the topology structure of M antenna ports and the codebook configuration type (Codebook-Config), etc., and notify the terminal via Downlink Control Information (DCI) and Radio Resource Control (RRC), etc.;

Determination according to the selection of the terminal: the terminal may select autonomously a grouping scheme according to a certain standard and report it to the base station; and Determination according to the feedback mode and parameters such as the value of M, as agreed between the terminal and the base station.

The transformation function Fk in this embodiment is equivalent to multiplication by matrix $W_0^k$.

Step 202: For K groups, each group uses a precoding codebook of 16 ports and configures the codebook parameter according to the topology structure of the ports in the group, and the form of precoding in each group is:

$$W_1 W_2 = \begin{bmatrix} X_1 \otimes X_2 & 0 \\ 0 & X_1 \otimes X_2 \end{bmatrix} \begin{bmatrix} e \\ \alpha e \end{bmatrix};$$

wherein $X_1 \otimes X_2$ in $W_1$ represents a beam combination fed back by the bandwidth on each polarization direction, $X_1$ and $X_2$ respectively represent Discrete Fourier Transform (DFT) vectors in horizontal and vertical directions, e in $W_2$ includes column selection vector, a beam to be fed back by the subband is selected from $X_1 \otimes X_2$, and α represents a phase difference between polarization directions. The beams in the horizontal and vertical directions included in $X_1 \otimes X_2$ are determined by the antenna topology of each group. For example, when the antenna topology structure is $N_1 \times N_2$, the $l^{th}$ column of $N_1 \times L_1$-dimensional matrix $X_1$ is the $O_1$-times oversampled DFT vectors:

$$\left[1, \exp\left(\frac{j2\pi l}{N_1 O_1}\right), L, \exp\left(\frac{j2\pi(N_1-1)l}{N_1 O_1}\right)\right]^T;$$

The $l^{th}$ column of $N_2 \times L_2$-dimensional matrix $X_2$ is the $O_2$-times oversampled DFT vectors:

$$\left[1, \exp\left(\frac{j2\pi l}{N_2 O_2}\right), L, \exp\left(\frac{j2\pi(N_2-1)l}{N_2 O_2}\right)\right]^T;$$

wherein the oversampling factor is determined by the port topology structure, and the relation is as shown in Table 1.

TABLE 1

| Amount of Ports | $(N_1, N_2)$ | $(O_1, O_2)$ |
|---|---|---|
| 8 | (2, 2) | (4, 4), (8, 8) |
|   | (4, 1) | (8, —) |
| 12 | (2, 3) | (8, 4), (8, 8) |
|   | (3, 2) | (8, 4), (4, 4) |

TABLE 1-continued

| Amount of Ports | (N$_1$, N$_2$) | (O$_1$, O$_2$) |
|---|---|---|
| 16 | (2, 4) | (8, 4), (8, 8) |
|  | (4, 2) | (8, 4), (4, 4) |
|  | (8, 1) | (4, —), (8, —) |

Step 203: The terminal selects s precoding matrixes from the K candidate precoding matrixes as the final precoding matrixes.

Step 204: The terminal feeds back the group-number of the selected precoding matrix and the precoding matrix index obtained in this group according to the codebook for N ports to the base station.

As described above, the construction of $W_0^k$ is as shown below:

$$W_0^k = [e_M^{\pi_1}, L, e_M^{\pi_{N_k}}];$$

wherein $e_a^b$ represents a vector with a dimension of a×1, the b$^{th}$ element of 1 and other elements of 0; ($\pi_1$, L, $\pi_{N_k}$) represents an arrangement consisted of $N_k$ digits from (1, L, M), wherein, $\pi_1$, L, $\pi_{N_k}$ are port-numbers included in the group containing the final precoding matrix selected from K candidate precoding matrixes, and the value of $N_k$ may be selected from a set {8, 12, 16}.

Embodiment 3

Figure 2:
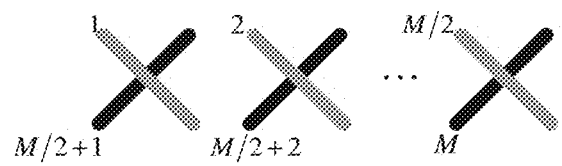
FIG. 2 is a schematic diagram of a dual polarized antenna numbering scheme according to an embodiment of the disclosure.

In this embodiment, for a dual polarized antenna system, codebook-based precoding construction and feedback may be realized by employing the method of Embodiment 1. However, by utilizing the characteristic that the channel state information in the two polarization directions are similar, terminal complexity and feedback overhead may be further reduced. It is assumed that the total number of base station antennas is M, and each polarization direction includes M/2 ports. The numbering scheme of the M ports is as follows: the ports in the first polarization direction are numbered as 1 to M/2, and the ports in the second polarization direction are numbered as M/2+1 to M. For example, the numbering scheme is shown in FIG. 2.

The terminal uses a codebook for N ports as a maximum number of supportable ports, where N<M, and the precoding has a structure below:

$$W=W_0W_1;$$

wherein, $W_1$ is a precoding matrix selected by using the codebook for N ports, $W_0$ is an antenna port selection matrix, and mapping is implemented between the M ports and the N ports. The implementation mode includes the following steps.

Step 301: The M ports are divided into K groups, with each group including N ports, and there are N/2 ports in each polarization direction.

The transformation function $F_k$ in this embodiment is equivalent to multiplication by matrix $W_0$.

Step 302: In each group, the terminal selects a precoding matrix according to the codebook for N ports and takes it as a candidate precoding.

Step 303: The terminal selects s precoding matrixes from the K candidate precoding matrixes as the final precoding matrixes.

Step 304: The terminal feeds back the group-number of the selected precoding matrix and the precoding matrix index obtained in this group according to the codebook for N ports to the base station.

As described above, the construction of $W_0$ is as shown below:

$$W_0=[e_M^{\pi_1}, L, e_M^{\pi_{N/2}}, e_M^{\pi_1+M/2}, L, e_M^{\pi_{N/2}+M/2}];$$

wherein $e_a^b$ represents a vector with a dimension of a×1, the b$^{th}$ element of 1 and other elements of 0; ($\pi_1$, L, $\pi_{N/2}$) represents an arrangement consisted of N/2 numbers selected from (1, L, M/2), wherein ($\pi_1$, L, $\pi_{N/2}$) are port-numbers in the first polarization direction included in the group containing the final precoding matrix.

Embodiment 4

In this embodiment, for a system with M antenna ports of a base station, in the above three embodiments, the channel information obtained by the M antenna ports is decomposed into K port sets of channel information via function $F_k$, wherein k=1, . . . , K, and each of the port sets includes $N_k$ ports.

For different k=1, . . . , K, $N_k$ may be equal to each other (as discussed in Embodiment 1 and 3) or may be unequal to each other (as discussed in Embodiment 2).

Before such a channel information feedback, parameters to be fed back need to be agreed between the base station and the terminal. The parameters include K, the value of $N_1$, $N_2$, . . . , $N_K$, the amount s of channel information to be reported, the transformation function $F_1, F_2, \ldots, F_K$ and the topology structure of each port subset after transformation. If the transformation function $F_k$ is multiplication by matrix $W_0^1, W_0^2, \ldots, W_0^K$ as discussed in Embodiments 1, 2 and 3, the parameters may further include matrix dimensions and positions of non-zero elements in the matrix, etc.

The parameter agreement scheme between the base station and the terminal may include the following steps.

Step 401: The base station configures the parameters and notifies the terminal, and the mode in which the base station notifies the terminal includes DCI issuing or RRC signaling.

Step 402: The terminal selects the parameters and reports to the base station.

For Step 401, the base station may determine the parameters according to the following steps.

Step 411: The base station determines the parameters according to the value of M and notifies the terminal via DCI issuing or configuration RRC signaling.

Step 412: The base station determines the parameter according to the topology structure of M antenna ports and notifies the terminal via DCI issuing or configuration RRC signaling.

Step 413: The base station determines the parameters according to the RRC parameter Codebook-Config and notifies the terminal via DCI issuing or configuration RRC signaling.

Step 414: The base station determines the parameters according to the feedback mode and notifies the terminal via DCI issuing or configuration RRC signaling.

For Step 402, the terminal may select the parameter according to a certain criterion, put it into a UCI and reports it to the base station via a Physical Uplink Shared Channel (PUSCH) or a Physical Uplink Control Channel (PUCCH).

Embodiment 5

In this embodiment, the possible values of some important parameters are listed.

As shown in Embodiments 1 to 4, the channel information obtained by M antenna ports is decomposed into K port sets of channel information via transformation function $F_1$, $F_2, \ldots, F_K$, and the transformation function $F_k$ may be multiplication by linear matrixes $W_0^1, W_0^2, \ldots, W_0^K$, wherein each matrix $W_0^k$ has a dimension of $M \times N_k$. One important function of $W_0^k$ is to implement the selection of antenna ports, and it has the property below:

$$W_0^k = [e_M^{\pi_1}, L, e_M^{\pi_{N_k}}];$$

wherein $e_a^b$ represents a vector with a dimension of $a \times 1$, the $b^{th}$ element of 1 and other elements of 0; $(\pi_1, L, \pi_N)$ represents an arrangement consisted of $N_k$ digits from $(1, L, M)$, wherein $\pi_1, L, \pi_N$, are port-numbers included in the group containing the final precoding matrix selected from K candidate precoding matrixes.

$N_k$ represents the amount of ports in the $k^{th}$ port subset, and for different $k=1, \ldots, K$, $N_k$ may be equal to each other or may be unequal to each other. For LTE codebook-based channel information feedback, $N_k$ may be selected from a set $\{2, 4, 8, 12, 16\}$.

The amount K of the port subsets and the amount s of reported channel information can be valued as $K \geq 1$ and $s \geq 1$. In order to realize a large antenna selection gain, K may be selected as an integer greater than 1. The larger K is, the greater the antenna selection gain will be. In addition, the smaller s is, the smaller the precoding information feedback overhead will be. When the channel information feedback overhead is strictly limited, s may be selected as 1.

The topology structure of $N_k$ ports in each port subset may vary with the change in the value of $N_k$. For LTE codebook-based channel information feedback, if dual polarized antenna is used, each polarization direction has the same antenna topology structure, which must be a 1D-linear topology or a 2D-rectangular/square topology, then the relation between the topology structure of each port subset and $N_k$ would be as shown in Table 2:

TABLE 2

| $N_k$ | Topology of Subset Port |
|---|---|
| 2 | (1, 1) |
| 4 | (2, 1)(1, 2) |
| 8 | (2, 2)(4, 1) |
| 12 | (2, 3)(3, 2) |
| 16 | (2, 4)(4, 2)(8, 1) |

If the used transformation function is multiplication by the above matrix $W_0^1, W_0^2, \ldots, W_0^K$, the positions of non-zero elements in the matrix $W_0^k$ will be determined by the port-number included in the port subset. For LTE codebook-based channel information feedback, because each antenna port subset has a 1D-linear topology or a 2D-rectangular/square topology, the parameters that determine the positions of non-zero elements in $W_0^k$ include the antenna topology of M ports, and the starting position, topology structure and port span of port subset k, etc. Therefore, matrix $W_0^k$ may be determined via four groups of parameters: topology of M ports, horizontal and vertical spaces of starting position, the amount of ports in horizontal and vertical directions, and spans of the ports in the horizontal and vertical directions. For example, for a 32-port dual polarized antenna system, the topology structure is 4×4, the topology of each port subset is 2×2, the starting port span is (1, 2), and the subset port span is (1, 1), then K=6, the sum of $N_1, N_2, \ldots, N_K$ is greater than 32, and the port mapping is as shown in FIG. 3, wherein each grid represents the ports in two polarization directions at the same position, and the ports covered by each circle represent a port subset.

If these parameters are configured by the base station, the base station needs to notify these three groups of parameters to the terminal via DCI or RRC, and the terminal reports the selected subset index and the precoding indicator of each selected subset; if these parameters are selected by the terminal, the terminal needs to report the selected ports to the base station via a bitmap while reporting the PMI.

Embodiment 6

In this embodiment, a method for configuring codebook parameters by a base station is provided. In this embodiment, the channel information obtained by the M antenna ports is decomposed into K port sets of channel information via transformation function $F_1, F_2, \ldots, F_K$, and the transformation function $F_K$ may be multiplication by linear matrix $W_0^1, W_0^2, \ldots, W_0^K$, wherein each matrix $W_0^k$ has a dimension of $M \times N_k$. One important function of $W_0^k$ is to implement the selection of antenna ports, and it has the property below:

$$W_0^k = [e_M^{\pi_1}, L, e_M^{\pi_{N_k}}];$$

wherein, $e_a^b$ represents a vector with a dimension of $a \times 1$, the $b^{th}$ element of 1 and other elements of 0; $(\pi_1, L, \pi_{N_k})$ represents an arrangement consisted of $N_k$ digits from $(1, L, M)$, wherein $\pi_1, L, \pi_{N_k}$ are port-numbers included in the group containing the final precoding matrix selected from K candidate precoding matrixes, and s information is selected from these K information and reported to the base station. The base station configures the parameters in $W_0^1$, $W_0^2, \ldots, W_0^K$, for example, $N_k$, K and s, etc., in the following steps.

Step 601: The base station estimates an uplink channel according to an uplink reference signal.

Step 602: The base station estimates uplink channel parameters such as time delay extension and angle extension, etc., and the base station determines the codebook parameter configuration according to the channel information parameters.

Step 603: The base station notifies the terminal of the determined codebook parameter configuration.

In Step 602, the method by which the base station configures the codebook parameter according to the channel information parameter may be realized in various ways. For example, when the angle extension is large, $N_k$ with a large topology spacing is selected, and relatively large K and s are selected. Also, when the time delay extension is small, the channel information is updated fast, and the feedback quantity is large, so that small K and s may be configured.

Embodiment 7

In this embodiment, a method by which a terminal determines a codebook parameter is provided. As shown in Embodiments 1 to 6, the channel information obtained by the M antenna ports is decomposed into K port sets of channel information via transformation function $F_1$, $F_2, \ldots, F_K$, and the transformation function may be multiplication by linear matrix $W_0^1, W_0^2, \ldots, W_0^K$, wherein each matrix $W_0^k$ has a dimension of $M \times N_k$. One important function of $W_0^k$ is to implement the selection of antenna ports, and it has the property below:

$$W_0^k = [e_M^{\pi_1}, L, e_M^{\pi_{N_k}}];$$

wherein $e_a^b$ represents a vector with a dimension of $a \times 1$, the $b^{th}$ element of 1 and other elements of 0; $(\pi_1, L, \pi_{N_k})$ represents an arrangement consisted of $N_k$ digits from $(1, L, M)$, wherein $\pi_1, L, \pi_{N_k}$ are port-numbers included in the group containing the final precoding matrix selected from K candidate precoding matrixes, and s information is selected from these K information and reported to the base station. The terminal selects the parameters in $W_0^1, W_0^2, \ldots, W_0^K$, for example, $N_k$, K and s, etc., in the following steps.

Step 701: The terminal estimates a downlink channel according to a downlink reference signal.

Step 702: The terminal determines the codebook parameter configuration according to the estimated downlink channel information, such as time delay extension and angle extension.

Step 703: The terminal reports the determined codebook parameter to the base station.

In Step 702, the method by which the terminal selects codebook parameters according to the channel information parameters may be realized in various ways. For example, when the angle extension is large, $N_k$ with a large topology spacing is selected, and relatively large K and s are selected. Also, when the time delay extension is small, the channel information is updated fast, and the feedback quantity is large, so that small K and s may be configured. In addition, multiple sets of parameters may be configured in advance, the terminal configures multiple sets of codebooks and an expected performance indicator according to the obtained multiple sets of parameters, selects a precoding matrix with the best performance therefrom, and reports the indicator information thereof together with the parameter configuration information to the base station.

Embodiment 8

In this embodiment, a method by which a terminal reports the precoding indicator information is listed. In this embodiment, the channel information obtained by the M antenna ports is decomposed into K types of port sets of channel information via transformation function $F_1, F_2, \ldots, F_K$, and the terminal select s types of information from the K types of information to report to the base station. The method by which the terminal reports the precoding information may be divided into the following two schemes:

Scheme 801: The terminal constructs K types of subcodebooks based on the decomposed K types of channel information according to the parameter configuration to select s types of subcodebooks therefrom, and obtains a precoding matrix using the selected s types of subcodebooks, and the terminal feeds back the indicator information of the precoding matrix in each type of subcodebook and feeds back the index number of the subcodebook type including the same; and Scheme 802: The terminal constructs a big codebook including the K types of channel information according to the decomposed K types of channel information, selects a precoding matrix from the big codebook and feeds back the precoding indicator information of the selected precoding matrix in the big codebook.

Figure 4:
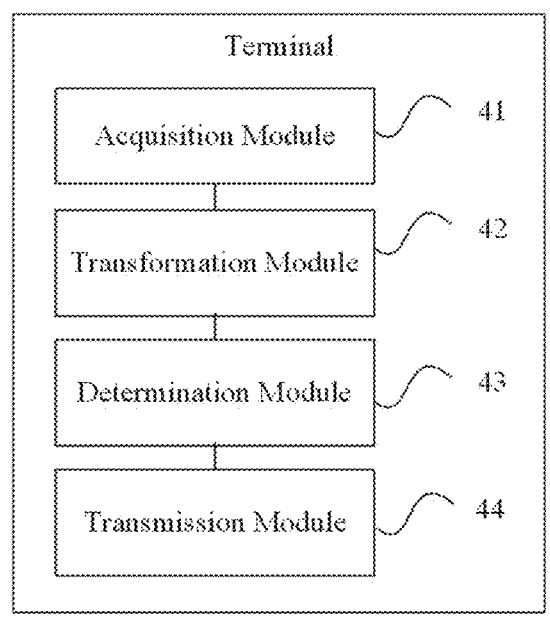
FIG. 4 is a schematic diagram of a terminal according to an embodiment of the disclosure.

FIG. 4 is a schematic diagram of a terminal according to an embodiment of the disclosure. As shown in FIG. 4, the terminal according to this embodiment includes:

an acquisition module 41, configured to receive channel state information-reference signals (CSI-RSs) of M ports transmitted by a base station and obtain M-dimensional downlink channel information by estimating according to the CSI-RSs;

a transformation module 42, configured to perform a linear transformation on the M-dimensional downlink channel information by using a transformation function $F_k$ to obtain $k^{th}$ type of channel information with $N_k$-dimensions, wherein, $k=1, \ldots, K$, $M \geq N_k$, and $K \geq 1$;

a determination module 43, configured to perform channel information quantization on the $k^{th}$ type of channel respectively by using a preset $N_k$-dimensional codebook to determine a corresponding precoding matrix and precoding matrix indicator information ($PMI_k$); and a transmission module 44, configured to select s types of channel information from the K types of channel information and feed index numbers of the selected channel information and the corresponding PMIs back to the base station.

The transformation function $F_k$ used by the transformation module is a linear transformation function.

In an exemplary embodiment, the transformation function $F_k$ used by the transformation module 42 is multiplication of a matrix $W_k$, wherein the matrix $W_k$ is a matrix of M rows and $N_k$ columns, and the elements of the matrix $W_k$ are determined by at least one parameter of: a topology of M ports, horizontal and vertical spacing of a starting port, the amount of ports in horizontal and vertical directions, and spans of the ports in the horizontal and vertical directions.

Furthermore, an embodiment of the present disclosure further provides a computer-readable storage medium storing computer-executable instructions, which when being executed by the processor, causes the above method for channel information feedback in the multi-antenna system.

Those of ordinary skill in the art will appreciate that all or some of the steps in the methods, systems, and functional modules/units in the devices mentioned above may be implemented as software, firmware, hardware, and suitable combinations thereof. In a hardware implementation, the division between functional modules/units mentioned above does not necessarily correspond to a division of physical units; for example, one physical component may have multiple functions, or one function or step may be executed by coordination of several physical components. Some or all of the components may be implemented as software executed by a processor, such as a digital signal processor or microprocessor, as hardware, or as an integrated circuit, such as an application specific integrated circuit. Such software may be distributed on a computer-readable medium, which may include computer storage media (or non-transitory media) and communication media (or transitory media). As is well known to those of ordinary skill in the art, the term computer storage medium includes volatile and nonvolatile, removable and non-removable media implemented in any method or technology for storing information, such as computer-readable instructions, data structures, program modules or other data. Computer storage media includes, but is not limited to, RAM, ROM, EEPROM, flash memory or other memory technology, CD-ROM, digital versatile disc (DVD) or other optical disc storage, magnetic cassette, magnetic tape, magnetic disk storage or other magnetic storage device, or may be used to store desired information and may be any other medium accessible by a computer. Moreover, it is well known to those of ordinary skill in the art that the communication media typically includes computer-readable instructions, data structures, program modules, or other data in a modulated data signal, such as a carrier wave or other transmission mechanism, and may include any information delivery media.

The above is only an exemplary embodiment of the present disclosure, and the present application may have various other embodiments. Those skilled in the art can make various corresponding changes and modifications according to the present application without departing from the spirit and spirit of the present disclosure. Such the changes and modifications are intended to be included within the scope of the appended claims.

INDUSTRIAL APPLICABILITY

The embodiments of the present disclosure provide a method for channel information feedback in a multi-antenna system and a terminal, which can effectively reduce feedback overhead.

What is claimed is:

1. A method for channel information feedback in a multi-antenna system, comprising:
    receiving, by a terminal, channel state information-reference signals (CSI-RSs) of M ports transmitted by a base station, and obtaining M-dimensional downlink channel information by estimating according to the CSI-RSs;
    obtaining, by the terminal, according to the M-dimensional downlink channel information and a transformation function $F_k$, a $k^{th}$ type of channel information with $N_k$ dimensions, wherein k is greater than or equal to 1 and is less than or equal to K, $N_k$ is an integer greater than or equal to 1, M is an integer greater than or equal to 1, $M \geq N_k$, and $K \geq 1$;
    performing, by the terminal, channel information quantization on the $k^{th}$ type of channel information respectively by using a preset $N_k$-dimensional codebook, to determine a corresponding precoding matrix and precoding matrix indicator information ($PMI_k$); and
    selecting, by the terminal, s types of channel information from K types of channel information, and feeding index numbers of the selected channel information and the corresponding PMIs back to the base station, wherein s is an integer greater than or equal to 1.

2. The method as claimed in claim 1, wherein the transformation function Fk is a linear transformation function.

3. The method as claimed in claim 2, wherein the transformation function $F_k$ is a multiplication of a matrix $W_k$, and the matrix $W_k$ is a matrix of M rows and $N_k$ columns.

4. The method as claimed in claim 3, wherein for the $i^{th}$ column of the matrix $W_k$, the $k_i^{th}$ element is 1 and the elements other than the $k_i^{th}$ element are 0, and wherein i is greater than or equal to 1 and is less than or equal to $N_k$, and $k_i$ is greater than or equal to 1 and is less than or equal to M.

5. The method as claimed in claim 4, further comprising, for the matrix $W_k$ determining that both an element of the $i^{th}$ column and the $k_i^{th}$ row and an element of the $j^{th}$ column and the $k_j^{th}$ row are 1, and i is not equal to j, then $k_i$ is not equal to $k_j$, wherein both i and j are greater than or equal to 1 and less than or equal to $N_k$, and both $k_i$ and $k_j$ are greater than or equal to 1 and less than or equal to M.

6. The method as claimed in claim 5, wherein elements of the matrix $W_k$ are determined by at least one of the following parameters: a topology of M ports, horizontal and vertical spacing of a starting port, the amount of ports in horizontal and vertical directions, or spans of the ports in the horizontal and vertical directions.

7. The method as claimed in claim 1, wherein K>1, and not all the values of $N_k$ are equal.

8. The method as claimed in claim 1, wherein K>1, and $$\sum_1^K N_k$$

is greater than or equal to M.

9. The method as claimed in claim 1, wherein the value of K, the value of $N_k$ and the transformation function $F_k$ are determined according to at least one of:
    a value of M;
    a base station configuration signaling;
    a feedback mode; or
    selecting by the terminal and feeding back to the base station.

10. The method as claimed in claim 9, wherein determining the value of K and the value of $N_k$ according to the base station configuration signaling comprises at least one of:
    determining the value of K and the value of $N_k$ according to a topology structure of an antenna of the base station and configuring by the base station signaling; or
    determining the value of K and the value of $N_k$ according to a codebook configuration type and configuring by the base station signaling.

11. The method as claimed in claim 9, wherein determining the transformation function $F_k$ according to the base station configuration signaling comprises:
    determining that the transformation function $F_k$ is multiplication of a matrix $W_k$, and determining positions of non-zero elements in the matrix $W_k$ by the base station configuration signaling; or, determining at least one of following of the matrix $W_k$ by the base station configuration signaling: the number of rows, the number of columns, or both the number of rows and columns.

12. The method as claimed in claim 9, wherein selecting the transformation function $F_k$ by the terminal and feeding the $F_k$ back to the base station comprises:
    determining that the transformation function $F_k$ is multiplication of a matrix $W_k$, and selecting positions of non-zero elements in the matrix $W_k$ by the terminal and feeding the positions back to the base station; or, selecting at least one of followings of the matrix $W_k$ by the terminal and feeding back to the base station: the number of rows, the number of columns, or the number of rows and the number of columns.

13. The method as claimed in claim 1, wherein:
    the value of the s is agreed to by the base station and the terminal;
    the value of the s is determined by a base station configuration; or
    the value of the s is selected and fed back by the terminal to the base station.

14. A terminal, comprising:
    an acquisitioner configured to receive channel state information-reference signals (CSI-RSs) of M ports transmitted by a base station and obtain M-dimensional downlink channel information by estimating according to the CSI-RSs;
    a transformer configured to obtain a $k^{th}$ type of channel information with $N_k$-dimensions according to the M-dimensional downlink channel information and a transformation function $F_k$, wherein, k is greater than or equal to 1 and is less than or equal to K, $N_k$ is an integer greater than or equal to 1, M is an integer greater than or equal to 1, $M \geq N_k$, and $K \geq 1$;

a determiner configured to perform channel information quantization on the $k^{th}$ type of channel information respectively by using a preset $N_k$-dimensional codebook to determine a corresponding precoding matrix and precoding matrix indicator information ($PMI_k$); and a transmitter configured to select s types of channel information from K types of channel information and feed index numbers of the selected channel information and the corresponding PMIs back to the base station, wherein s is an integer greater than or equal to 1.

15. The terminal as claimed in claim 14, wherein the transformation function $F_k$ used by the transmitter is a linear transformation function.

16. The terminal as claimed in claim 15, wherein the transformation function $F_k$ used by the transmitter is multiplication of a matrix $W_k$, wherein the matrix $W_k$ is a matrix of M rows and $N_k$ columns, and the elements of the matrix $W_k$ are determined by at least one parameter of: a topology of M ports, horizontal and vertical spacing of a starting port, the amount of ports in horizontal and vertical directions, or spans of the ports in the horizontal and vertical directions.

* * * * *